United States Patent [19]

Scull

[11] 4,248,403
[45] Feb. 3, 1981

[54] PLUG ASSEMBLY FOR MOVABLE PLUG VALVES

[75] Inventor: William L. Scull, Rockaway Township, Morris County, N.J.

[73] Assignee: Leslie, Co., Parsippany, N.J.

[21] Appl. No.: 1,963

[22] Filed: Jan. 8, 1979

[51] Int. Cl.³ ............................................ F16K 25/00
[52] U.S. Cl. ....................................... 251/85; 251/86; 251/298
[58] Field of Search ....................... 251/84, 85, 86, 87, 251/88, 298, 304

[56] References Cited

U.S. PATENT DOCUMENTS

| 1,165,197 | 12/1915 | Marsh | 251/86 |
| 1,487,815 | 3/1924 | Simonsen | 251/85 |
| 1,942,417 | 1/1934 | Ferlin et al. | 251/84 |
| 2,479,688 | 8/1949 | Lindgren | 251/86 |
| 3,558,098 | 1/1971 | Puster | 251/88 |
| 3,721,424 | 3/1973 | Vanderlinden | 251/86 |
| 3,831,622 | 8/1974 | Grewer et al. | 251/86 |
| 3,963,211 | 6/1976 | Myers | 251/85 |

FOREIGN PATENT DOCUMENTS

| 229099 | 8/1963 | Austria | 251/85 |
| 832822 | 2/1952 | Fed. Rep. of Germany | 251/86 |
| 901503 | 7/1945 | France | 251/85 |
| 5471 | of 1889 | United Kingdom | 251/85 |

Primary Examiner—Martin P. Schwadron
Assistant Examiner—G. L. Walton
Attorney, Agent, or Firm—Lerner, David, Littenberg & Samuel

[57] ABSTRACT

An improved plug assembly for seating against a valve seat, the plug assembly being usable in a movable plug valve which controls the flow of the fluid through a conduit. The plug assembly includes an arm member, a plug member and biasing means. The arm member is adapted to be mounted for movement in the conduit and has an enlarged head. The plug member has a first face for sealingly engaging the valve seat and a rear face. The plug member further includes a recessed opening in one of the front and rear faces for receiving and retaining the enlarged head of the arm member for relative movement with respect thereto. The biasing means is disposed in the recessed opening and normally urges the enlarged arm head and the plug member into tight engagement with one another.

16 Claims, 4 Drawing Figures

PLUG ASSEMBLY FOR MOVABLE PLUG VALVES

BACKGROUND OF THE INVENTION

The present invention relates to movable plug valves for controlling the flow of fluid through a conduit, and more particularly to rotary plug valves used to control the flow rate of fluid in pipe lines.

Rotary plug valves generally include a hollow tubular body which is inserted between two sections of pipe or other conduit. The closure mechanism of the valves generally comprises a valve seat or seat ring in one end of the body that cooperates with a spherical plug to seal or close the valve. The plug is attached to an arm which is connected to an input shaft which is arranged transversely to the pipe center line so that as the shaft is rotated by an external means, the plug swings toward or away from the valve seat to modulate the flow rate. The input shaft centerline is usually offset from the valve seat centerline so that the plug will tend to pull away from the seat during opening to thereby reduce the tendency of the part to rub and wear.

A basic problem in the design of rotary plug valves is that the plug must be aligned precisely with the valve seat when the two parts are brought together in order to produce low fluid leakage. That is, when the input shaft is rotated to move the plug towards the valve seat and into engagement therewith, the spherical seating surface of the plug must be capable of being aligned precisely with the peripheral seating surface of the seat to completely close off the flow with minimal leakage.

One type of prior art arrangement for accomplishing this alignment included designing the arm, plug, or seat to bend or flex to allow the parts to be forced into alignment by the input mechanism. With such prior art arrangements, it was desirable to have the parts flex into alignment with a minimum force input in order to utilize smaller, less expensive actuators. This in turn required that the spring rate of the flexing parts be low. However, low spring rates can in turn lead to vibrations of the parts in the open position as a result of fluid turbulence which thus could compromise the reliability of the assembly. Furthermore, designing parts to be flexible also reduced the capability of the parts to carry the required loads, which thus tended to increase the probability of fatigue failure.

Other prior art arrangements for accomplishing the alignment of the spherical plug with the valve seat included machining parts to very close tolerances and/or adjustment of the position of the parts at assembly. However, such prior art arrangements are also disadvantageous in that they are expensive and complicate remachining of worn parts. Furthermore, they do not take into account or compensate for possible dimensional changes due to temperature and/or wear which otherwise might cause leakage.

Further, while other prior art valve arrangements disclose flexible coupling arrangements for joining or coupling the components together, these prior art arrangements introduce additional problems into the design of the plug valves. For example, U.S. Pat. No. 1,487,815 entitled "Poppet Valve", issued Mar. 25, 1924, discloses a poppet valve having a valve head capable of tilting movement in relation to the valve stem so that when the valve is forced into place upon its valve seat, the head will automatically adjust itself to properly seat or align itself with the valve seat. However, that arrangement introduces an additional fluid leakage path through the coupling mounting (i.e., between the valve head and the valve stem) which thus is unacceptable in systems where it is desired to minimize the fluid leakage when the valve is in its closed position.

SUMMARY OF THE INVENTION

The present invention overcomes these and other disadvantages of the prior art. In accordance with the present invention, there is provided a plug assembly for seating against a valve seat in a conduit, the plug assembly being usable in a movable plug valve which controls the flow of fluid through the conduit. The plug assembly comprises an arm member having an enlarged head. A plug member is provided having a front face for sealingly engaging the valve seat and a rear face. The plug member further includes a recessed opening in one of the front and rear faces for receiving and retaining the enlarged head for relative movement with respect thereto. Biasing means are provided in the recessed opening for normally urging the head and the plug member into tight engagement with one another.

Such a plug assembly is not dependent upon close machining tolerances for accomplishing alignment of the plug member with the valve seat, and further compensates for inservice dimensional changes due to temperature and/or wear. When the plug member is moved towards the valve seat, assuming some eccentricity of the components, the plug member will initially engage only a portion of the valve seat. Upon continued movement of the plug member towards the closed position of the valve, the actuator load will overcome the biasing force of the biasing means in the recessed opening to permit relative movement of the plug member about the enlarged head to properly seat the sealing portion of the plug member against the entire periphery of the valve seat to thereby close the valve. Since the head is mounted to the plug member in a recessed opening which does not extend completely through the plug member, the possibility of leakage is minimized, not increased as with prior art compliant couplings. Furthermore, the loading produced by the biasing means normally urging the head and the plug member into tight engagement serves to minimize the possibility of fluid induced vibration of the components.

In the preferred embodiment, the biasing means comprises a flexible planar spring member disposed in the recessed opening between the head and the plug member and normally flexed to urge the plug member and head into tight engagement.

In a further preferred embodiment, the recessed opening includes a first bore and a second bore of lesser diameter than the first bore, and the flexible spring member is disposed in the first bore in engagement with the shoulder defined between the first and second bores. The plug assembly further includes a retaining means for retaining the head in the recessed opening in engagement with the spring member. In one preferred form, the spring member comprises a spring disc and the head is disposed in the first bore and held in tight engagement with the spring disc by a retaining nut threadably connected to the plug member adjacent the open end of the first bore. In an alternative preferred form, the spring member comprises an annular spring washer and the head is disposed in the second bore and retained therein by the inner peripheral edge of the annular spring washer. The annular spring washer is held in the first bore by a retaining nut which engages the outer peripheral edges thereof.

These and other features and characteristics of the present invention will be apparent from the following detailed description in which reference is made to the enclosed drawings which illustrate the preferred embodiment of the present invention.

DETAILED DESCRIPTION OF THE PREFERRED EMBODIMENT

Figure 1:
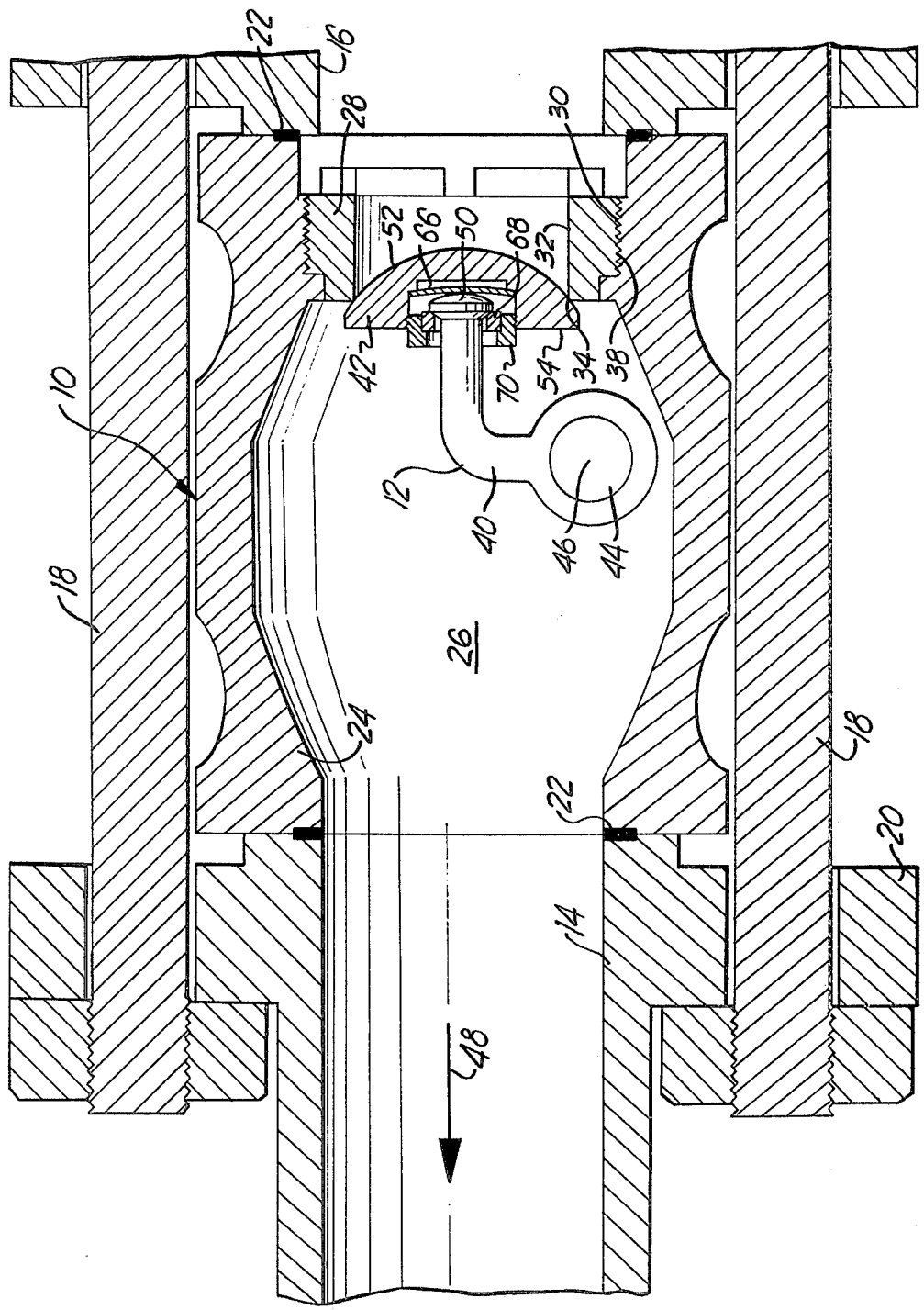
FIG. 1 is a side sectional view of the plug assembly and valve in accordance with the present invention with the valve arranged in a fluid conduit.

Referring now to the drawings in which like reference characters represent like elements, there is shown in FIG. 1 a movable plug valve 10 of the rotary type employing the novel plug assembly 12 in accordance with the present invention. The plug valve 10 is disposed between two sections of pipe 14, 16 which are clamped together by means of bolts 18 passing through aperatures in end flanges 20 of the pipe sections 14, 16. Suitable sealing means are employed, for example a gasket 22, between the sections of pipe 14, 16 and the plug valve 10 to prevent leakage therebetween.

The rotary plug valve 10 comprises generally a hollowed out valve body or housing 24 having a central fluid passageway 26 extending therethrough to be in communication with the conduit or pipe sections 14, 16. At one end of the valve body 24, there is provided a valve seat 28 threadably connected in a central bore or opening 30 of the valve body 24. The valve seat 28 comprises an annular member having a generally cylindrical inner surface 32 which terminates in a tapered or inclined portion 34 at one end against which the plug assembly 12 is adapted to sealingly mate. The outer surface 36 of the valve seat 28 is threaded to threadably engage suitable threads provided on the inner surface of the central bore 30 of the valve body 24. This arrangement is useful for providing easy replacement of worn components.

Interiorly of the valve body 24, there is provided a plug assembly 12 comprised of an arm 40 and a plug member 42 mounted thereon in accordance with the present invention. The arm is fixably mounted onto an input shaft 44 which is adapted to pivot or rotate about its central axis 46. As is conventional, the input shaft 44 may extend exteriorly of the valve body 24 and be connected to a suitable drive device for rotating or pivoting the input shaft 44, and thus the arm 40, about the axis 46 of the input shaft 44. The amount of rotation which is permitted is such as to swing the plug member 42 mounted to the end of the arm 40 toward and away from the valve seat 28 in order to control or modulate the flow rate through the valve body 24, thereby controlling or modulating the flow of fluid (moving generally in the direction of the arrow 48) through the pipes 14, 16. That is, the amount of rotation is such as to move the plug member 42 between a sealing position in which the plug member 42 is in sealing engagement with the valve seat 28 (as shown in FIG. 1) and a position in which the plug member 42 is removed or spaced from the valve seat 28 to permit substantially unobstructed flow of the fluid through the valve body 24.

The plug member 42 is mounted to the arm 40 through a compliant coupling which serves to hold the plug member 42 and the arm 40 together in stable relationship to preclude fluid induced vibration when the valve 10 is in an open (i.e., not sealed) position, but which permits the plug member 42 to move relative to the arm 40 to properly seat itself against the valve seat 28 when the plug assembly 12 is forced into its closed, sealed position.

Figure 2:
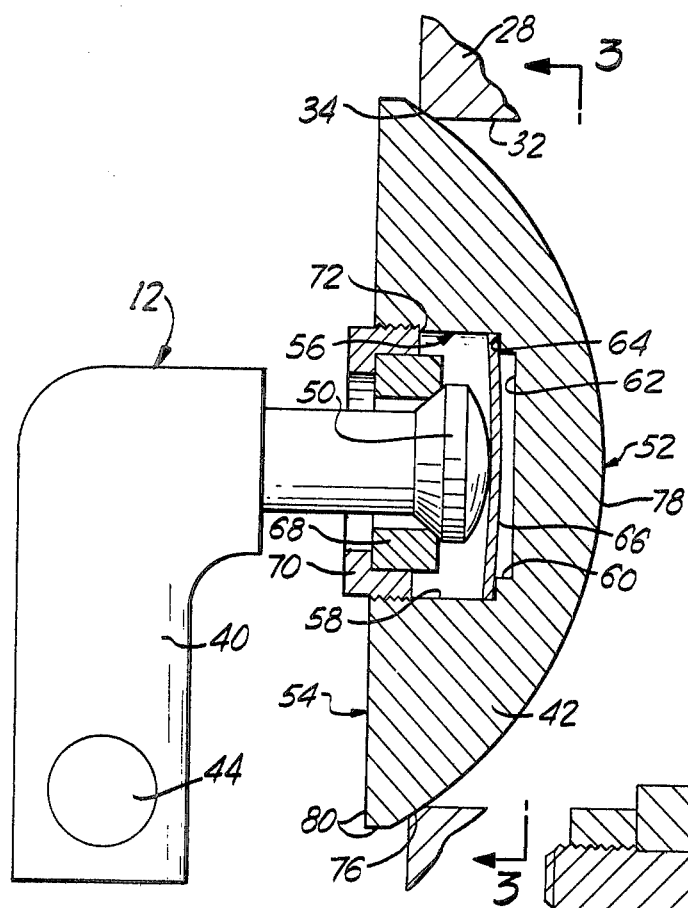
FIG. 2 is an enlarged side sectional view of the plug assembly of FIG. 1 in accordance with the present invention.

More particularly, the arm 40 is provided at the end remote from the input shaft 44 with a head 50 of an enlarged size. The plug member 42 has a spherical front face 52 and a rear face 54 provided with a recessed opening 56 for receiving the head 50 of the arm 40. As best seen in FIG. 2, the recessed opening 56 includes a first bore 58 open to the rear face 54 of the plug member 42 and second bore 60, of lesser diameter, terminating in a closed end 62 of the recessed opening 56. Thus, it is seen that the recessed opening 56 does not extend through the plug member 42. A shoulder or annular ledge 64 is defined between the first and second bores 58, 60 on which a circular planar spring disc 66 rests. The head 50 is disposed in the first or large bore 58 and is forced into engagement with the spring disc 66 by means of a split ring 68 which in turn is held in the plug member 42 by a threaded retaining ring 70 which engages suitable threads provided adjacent the open end of the first bore 58. A shoulder or annular ledge 72 is provided as a stop for the retaining ring 70.

The various parts are dimensioned so that the spring disc 66 is slightly bowed toward the closed end 62 of the second, smaller bore 60 to provide a preload when the retaining ring 70 is tightened down to the limit of its travel, i.e., the stop ledge 72. That is, when the retaining ring 70 is tightened down, the split ring 68 forces the head 50 into engagement to slightly bow the spring disc 66. This initial deflection of the spring disc 66 provides a residual preload which tends to force the head 50 against the conical face of the split ring 68 to hold the plug member 42 and the head 50 in stable relationship. This residual load thus serves to minimize or preclude fluid induced by vibrations when the plug valve 10 is in its open position.

To move the plug assembly 12 to its closed position, the input shaft 44 is rotated clockwise, (as viewed in FIG. 1) to move the plug member 42 toward the valve seat 28. Assuming some eccentricity of the components, the spherical front face 50 of the plug member 42 will initially hit one side of the valve seat 28 (as opposed to engaging the entire periphery of the valve seat 28 at once). To move the plug member 42 into its fully closed position, the load applied by the input shaft 44 is increased to thereby increase the arm load. This in turn will result in the arm 40 load overcoming the residual spring disc 66 load to force the head 50 away from the split ring 68, i.e., to the right, farther into the plug member 42, as viewed in FIGS. 1 and 2. When the head 50 moves away from the split ring 68, the plug member 42 can rotate about the valve seat point of contact and "roll" into full contact with the valve seat 28. This is possible since the recessed opening 56 in which the head 50 is retained is larger than the head 50. This rolling into full contact is also aided by the fact that the surface of the head 50 in engagement with the spring disc 66 is spherical or curved. The valve 10 can then be held in its closed position by any suitable means to maintain the plug member 42 in its seating engagement with the valve seat 28.

If an abnormally high load is applied via the input shaft 44, the spring bias disc 66 is designed to hit the bottom or closed end 62 of the second, smaller bore 60 of the plug member 42 to prevent overstressing or breakage of the disc 66. This built-in stop is advantageous to protect the flexing or biasing member from overload by limiting the amount of flexing movement which is permitted.

It is to be noted that when the valve 10 is in its closed position, the only possible path for leakage of the fluid through or around the valve 10 is between the continuous closed peripheral seating surface (i.e., the tapered portion 34) of the valve seat 28 and the corresponding continuous closed peripheral seating surface 76 of the plug member 42. Inside the closed periphery of the plug member seating surface 76, the plug member 42 is completely closed and continuous so as to be impervious to flow of fluid therethrough so as not to present any possible leakage path through the plug surface. In this regard, referring to FIGS. 2 and 3, it is to be noted that the exterior surface of the plug member can be divided into first and second plug surfaces 78, 80 separated by the continuous closed peripheral seating surface 76 which is adapted to sealingly engage the valve seat 28—a first surface 78 on the front face 52 inside the closed peripheral seating surface 76, and a second surface 80 constituting the remaining exterior surface of the plug member 42, i.e., the outer lip portions on the front face 52 outside the seating surface 76 and the entire exterior surface of the rear face 54 which includes the recessed opening 56 for receiving and retaining the head 50. The first surface 78 is completely closed and continuous to prevent any flow of fluid or leakage therethrough. So long as the recess opening 56 for the head 50 lies in one of the first and second surfaces 78, 80, and not along the seating surface 76 of the plug member 42, the recessed opening 56 will not provide an additional leakage path through the plug member 42. This is important as it permits the plug member 42 to be mounted onto the head 50 through a compliant coupling while not adding possible fluid leakage paths.

It is further to be noted that the fabrication and assembly of the plug assembly 12 of the present invention to ensure proper alignment along the centerline of the valve seat 28 so that the entire peripheral seating portion 76 seats and seals against the valve seat 28 is not dependent upon maintaining close machining tolerances since the compliant coupling arrangement permits some eccentricity of the components. Further, the design of the present invention compensates for inservice dimensional changes due to the temperature and/or wear which otherwise was not possible in the prior art designs.

Figure 4:
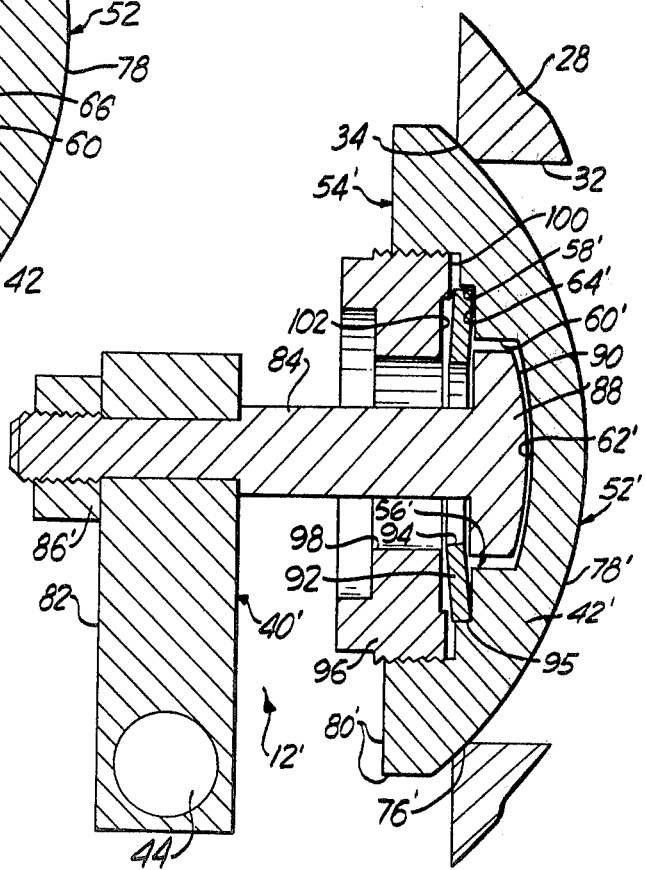
FIG. 4 is an enlarged side sectional view, similar to FIG. 2, showing an alternative arrangement for the plug assembly of the present invention.

An alternative arrangement for the plug assembly 12' of the present invention is shown in FIG. 4. In this embodiment, the member 40' comprises a first arm member 82 fixed to the input shaft 44 and a second arm member 84 extending through a transverse opening in the first arm member 82 and secured thereto by means of a nut 86. The second arm member 84 is provided with an enlarged head 88 at the end remote from the first arm member 82. However, the arrangement of the member 40 in FIG. 1 could have also been used for this alternative embodiment if desired.

Figure 3:
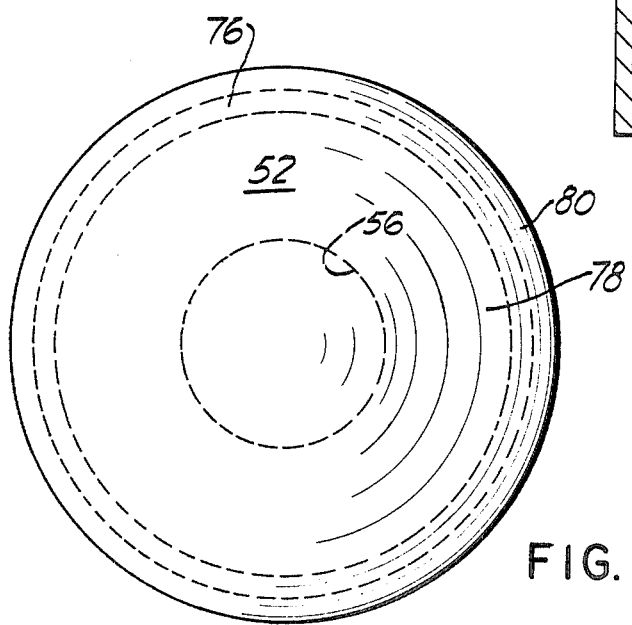
FIG. 3 is a plan view taken along lines 3—3 of FIG. 2, but with the valve seat removed for clarity, of the plug member in accordance with the present invention.

As with the arrangement shown in FIGS. 1-3, the plug member 42' in the alternative embodiment is provided with a recessed opening 56' which includes a first bore 58' and a second bore 60' of smaller diameter defining a shoulder 64' against which a planar spring member 92 rests. The head 88 has a spherical end surface 90 and is disposed in the second smaller bore 60' which includes a closed end surface 62' which is also curved or spherical. Preferably, the closed end surface 62' of the bore 60' has a larger radius of curvature than the end surface of the head 88 so that the plug member 42' and actuator head 88 can "roll" relative to one another.

The spring member 92 in this alternative embodiment comprises an annular spring washer 92 which rests on the shoulder 64' formed between the first and second bores 58', 60'. The inner peripheral edge 94 of the annular spring washer 92 rests against the head 88 to retain the actuator head 88 in the second bore 60'. A threaded retaining ring 96 is threadably connected to the plug member 42' and has a central opening 98 therethrough to allow the arm 84 to extend therethrough away from the head 88 and plug member 42'. The end surface of the retaining ring 96 facing the spring washer 92 is stepped to provide an outer annular hub 100 which engages the outer peripheral edge 95 of the spring washer 92 to hold the spring washer 92 against the shoulder 64', and an inner annular stop surface 102 which is normally spaced from the spring washer 92 when the retaining nut 96 is threaded into the plug member 42'.

The axial dimension of the head 88 is slightly greater than the axial dimension of the second bore 60' so that the rear end face of the head 88 extends slightly into the first bore 58' beyond the shoulder 64' formed between the first and second bores 58', 60'. This is advantageous for providing a preload applied by the spring washer 92 when the retaining nut 96 is tightened down into the plug member 42'. That is, when the retaining nut 96 is threaded into the plug member 42', the annular hub 100 engages the outer peripheral edge 95 of the spring washer 92 to force same into engagement with the shoulder 64' formed between the first and second bores 58', 60'. Because the rear face of the head 88 extends slightly into the first bore 58', the inner edge 94 of the spring washer 92 is deflected away from the shoulder 64' to provide a preload to maintain the head 88 and the plug member 42' in tight engagement to provide a stable relationship when the valve 10 is in an open position, i.e., to prevent fluid induced vibrations when the plug member 42' is not in engagement with the valve seat 28. It should be noted that in this alternative arrangement, the spring member 92 biases the plug member 42' in the opposite direction relative to the member 40' from that of the embodiment shown in FIG. 1.

The operation of the plug assembly 12' shown in FIG. 4 is similar to that of the embodiment shown in FIG. 1. When it is desired to move the plug assembly 12' into the closed position, external means rotate the input shaft 44 clockwise as shown in FIG. 4 to thereby move the plug assembly 12' toward the valve seat 28. Assuming some eccentricity of the components, the front face 52' of the plug member 42' will engage one side of the valve seat 28 initially. Further loading applied by the input shaft 44 will force the plug member 42' to pivot or rotate about the point of contact with the valve seat 28 (as a result of the spherical surface 90 of the actuator head 88 "rolling" against the closed end surface 62' of the second bore 60') to properly seat the plug member 42' against the valve seat 28. This rolling action occurs when the preload force applied by the spring washer 92 is overcome to allow a portion of the spring washer 92 to be deflected further out of the plane defined by the shoulder 64'. That is, during this pivoting motion into self-seating engagement with the valve seat 28, one edge of the spring washer 92 will be deflected further out of the plane to allow relative pivoting or rolling movement between the plug member 42' and the head 88. However, the amount of deflection is limited by the annular stop surface 102 of the retaining ring 96 which serves to prevent overdeflection, and thus overstressing, of the spring washer 92.

Again, it is to be noted that the plug member 42' includes a continuous closed peripheral seating surface 76' adapted to sealingly engage the valve seat 28 and which divides the exterior surface of the plug member 42' into first and second surfaces 78', 80', one of which is provided with the recessed opening 56' for receiving the head 88. The first surface 78' of the plug member 42' is inside the closed peripheral sealing portion 76' and is continuous and completely closed to prevent the flow of fluid therethrough, so that the only possible leakage path is between the continuous closed peripheral seating surface 34 of the valve seat 28 and the corresponding continuous closed peripheral seating surface 76' of the plug member 42'.

As with the embodiment shown in FIGS. 1-3, the plug assembly 12' shown in FIG. 4 compensates for inservice dimensional changes due to temperature and/or wear since proper sealing engagement of the plug assembly 12' with the valve seat 28 is not dependent on precise initial alignment of the plug member 42' with the valve seat 28. The plug assembly 12' of FIG. 4 thus also allows for a relaxation of machining tolerances in the fabrication of the various components.

Thus, it is seen that according to the present invention, there is provided a plug assembly 12 for seating against a valve seat 28 in a conduit 14, 16, the plug assembly 12 being usable in a movable plug valve 10 which controls the flow of fluid through the conduit 14, 16. The plug assembly 12 is comprised of a member 40, a plug member 42 and biasing means 66 (92). The member 40 is adapted to be mounted for movement in the conduit and is provided with a head 50 (88). The plug member 42 has a front face 52 for sealingly engaging the valve seat 28, and a rear face 54. A recessed opening 56 is defined in one of the front and rear faces 52, 54 for receiving and retaining the head 50 (88) of the member 40 for relative movement with respect thereto. The biasing means 66 (92) is disposed in the recessed opening 56 for normally urging the head 50 (88) and the plug member 42 into tight engagement with one another.

Although this invention has been described with respect to its preferred embodiments, it should be understood that many variations and modifications will be obvious to those skilled in the art, and it is preferred, therefore, that the scope of the invention be limited, not by the specific disclosure herein, but only by the appended claims.

What is claimed is:

1. A plug assembly for seating against a valve seat in a conduit, said plug assembly being useable in a movable plug valve which controls the flow of fluid through the conduit, said plug assembly comprising:

an arm having an enlarged head;

a plug member having a front face for sealingly engaging the valve seat and a rear face, said plug member including a recessed opening in one of said front and rear faces for receiving and retaining said head for relative movement with respect thereto, said recessed opening including a first bore, a second bore of lesser diameter than said first bore, and a shoulder defined therebetween, and said head being disposed in said first bore;

a flexible planar spring disc disposed in said first bore in engagement with said shoulder; and retaining means connected to said plug member adjacent the ends of said first bore opposite from said shoulder for retaining said head in said first bore in engagement with said flexible planar spring disc, said flexible planar spring disc being normally flexed to urge said head and said retaining means into engagement to normally prevent relative movement between said plug member and said head.

2. The plug assembly of claim 1 wherein said recessed opening is provided in said rear face of said plug member.

3. The plug assembly of claim 1 further including stop means for preventing flexing of said spring member beyond a predetermined limit.

4. The plug assembly of claim 1 wherein said retaining means is threadedly connected to said plug member adjacent said end of said first bore opposite from said shoulder.

5. The plug assembly of claim 3 wherein said stop means comprises the end of said second bore opposite from said shoulder being closed to prevent flexing of said spring disc beyond a predetermined limit.

6. The plug assembly of claim 1 wherein said retaining means includes an opening therethrough through which said arm member extends externally of said plug member, said opening in said retaining means being smaller than the size of said head to retain said actuator head in said first bore.

7. The plug assembly of claim 6 wherein the end of said second bore opposite from said shoulder is closed and has a face with a radius of curvature larger than that of the enlarged head to permit rocking movement of said plug member relative to said arm member.

8. A plug assembly for seating against a valve seat in a conduit, said plug assembly being useable in a movable plug valve which controls the flow of fluid through the conduit, said plug assembly comprising:

an arm member having an enlarged head;

a plug member having a front face for sealingly engaging the valve seat and a rear face, said plug member including a recessed opening in one of said front and rear faces for receiving and retaining said head for relative movement with respect thereto, said recessed opening including a first bore, a second bore of lesser diameter than said first bore, and a shoulder defined therebetween, said head being disposed in said second bore;

an annular spring washer disposed in said first bore in engagement with said shoulder, said annular spring washer having an inner peripheral edge defining a washer opening through which said arm member extends, and said washer opening being smaller than the size of said head so that the inner peripheral edges of said spring washer retain said head in said second bore; and retaining means for retaining said head in said recessed opening in engagement with said annular spring washer, said annular spring washer being normally flexed to urge said plug member and said head into engagement to normally prevent relative movement between said plug member and said head, said retaining means incuding a spring engaging surface for engaging the outer peripheral edges of said spring washer to retain said spring washer in said first bore with the inner peripheral edges thereof in engagement with said head.

9. The plug assembly of claim 8 wherein said retaining means includes a stop surface spaced from the plane of said spring engaging surface for preventing flexing of said inner peripheral edges of said spring washer beyond a predetermined limit.

10. The plug assembly of claim 8 wherein said retaining means includes an opening therethrough through which said arm member extends externally of said plug member.

11. The movable plug valve of claim 8 wherein said front face includes a continuous closed peripheral sealing portion for sealingly mating with said valve seat and wherein the portion of said front face within said continuous closed peripheral sealing portion is continuous and completely closed to prevent the flow of fluid therethrough.

12. The movable plug valve of claim 8 further including stop means for preventing flexing of said spring member beyond a predetermined limit.

13. A movable plug valve for controlling the flow of fluid through a conduit, said plug valve comprising:
   a hollow valve body;
   a valve seat arranged in the hollow interior of said valve body about a portion of the inner periphery of said valve body;
   an arm member mounted in said valve body for movement relative to said valve seat, said arm member having an enlarged head;
   a movable plug member having a front face for sealingly engaging said valve seat in a rear face, said plug member including a recessed opening in one of said front and rear faces for receiving and retaining said head for relative movement with respect thereto, said recessed opening including a first bore, a second bore of lesser diameter than said first bore, and a shoulder defined therebetween, and said head being disposed in said first bore;
   a flexible planar spring disc disposed in said first bore in engagement with said shoulder; and
   retaining means connected to said plug member adjacent the end of said first bore opposite from said shoulder for retaining said head in said first bore in engagement with said flexible planar spring disc, said flexible planar spring disc being normally flexed to urge said head and said retaining means into engagement to normally prevent relative movement between said plug member and said head.

14. A movable plug valve for controlling the flow of fluid through a conduit, said plug valve comprising:
   a hollow valve body;
   a valve seat arranged in the hollow interior of said valve body about a portion of the inner periphery of said valve body;
   an arm member mounted in said valve body for movement relative to said valve seat, said arm member having an enlarged head;
   a movable plug member having a front face for sealingly engaging said valve seat in a rear face, said plug member including a recessed opening in one of said front and rear faces for receiving and retaining said head for relative movement with respect thereto, said recessed opening including a first bore, a second bore of lesser diameter than said first bore, and a shoulder defined therebetween, said head being disposed in said second bore;
   an annular spring washer disposed in said first bore in engagement with said shoulder, said annular spring washer having an inner peripheral edge defining a washer opening through which said arm member extends, and said washer opening being smaller than the size of said head so that the inner peripheral edges of said spring washer retain said head in said second bore; and
   retaining means for retaining said head in said recessed opening in engagement with said annular spring washer, said annular spring washer being normally flexed to urge said plug member and said head into engagement to normally prevent relative movement between said plug member and said head, said retaining means including a spring engaging surface for engaging the outer peripheral edges of said spring washer to retain said spring washer in said first bore with the inner peripheral edges thereof in engagement with said head.

15. The movable plug valve of claim 14 wherein said front face includes a continuous closed peripheral sealing portion for sealingly mating with said valve seat and wherein the portion of said front face within said continuous closed peripheral sealing portion is continuous and completely closed to prevent the flow of fluid therethrough.

16. The movable plug valve of claim 14 further including stop means for preventing flexing of said spring member beyond a predetermined limit.

* * * * *